United States Patent
Shibata

(10) Patent No.: US 7,525,446 B2
(45) Date of Patent: Apr. 28, 2009

(54) DISPLAY DEVICE HAVING DECORATIVE MEMBER ON SCREEN

(75) Inventor: Hirokazu Shibata, Okazaki (JP)

(73) Assignee: Denso Corporation, Kariya (JP)

( * ) Notice: Subject to any disclaimer, the term of this patent is extended or adjusted under 35 U.S.C. 154(b) by 148 days.

(21) Appl. No.: 11/334,486

(22) Filed: Jan. 19, 2006

(65) Prior Publication Data
US 2006/0158320 A1 Jul. 20, 2006

(30) Foreign Application Priority Data
Jan. 20, 2005 (JP) ............................. 2005-013189

(51) Int. Cl.
G08B 5/00 (2006.01)
(52) U.S. Cl. .................. 340/815.4; 116/286; 362/26
(58) Field of Classification Search ............. 340/815.4, 340/461, 691.6, 815.78; 362/23, 26, 28, 362/29; 116/286
See application file for complete search history.

(56) References Cited

U.S. PATENT DOCUMENTS

| | | | | |
|---|---|---|---|---|
| 5,272,463 | A * | 12/1993 | Furuya et al. | 362/23 |
| 6,318,872 | B1 * | 11/2001 | Kato et al. | 362/26 |
| 6,499,852 | B1 * | 12/2002 | Kino et al. | 362/23 |
| 6,642,850 | B1 * | 11/2003 | Noll et al. | 340/815.4 |
| 6,682,201 | B2 * | 1/2004 | Kneer et al. | 362/26 |
| 6,714,126 | B2 * | 3/2004 | Wada | 340/815.4 |
| 6,741,184 | B1 * | 5/2004 | Miller et al. | 340/815.78 |
| 6,883,393 | B2 * | 4/2005 | Ishimaru | 116/286 |
| 6,915,758 | B2 * | 7/2005 | Nakagawa et al. | 116/286 |
| 7,113,080 | B2 * | 9/2006 | Suzuki | 340/815.4 |
| 7,207,117 | B1 * | 4/2007 | Cook et al. | 362/26 |
| 2004/0027041 | A1 | 2/2004 | Nishikawa | |
| 2005/0212669 | A1 | 9/2005 | Ono et al. | |

FOREIGN PATENT DOCUMENTS

| | | |
|---|---|---|
| JP | 08-268114 | 10/1996 |
| JP | 2001-091309 | 4/2001 |
| JP | 2003-065809 | 3/2003 |

OTHER PUBLICATIONS

Information Offer Form submitted in corresponding Japanese Application No. 2005-13189 dated Jan. 11, 2008 with English translation.
Japanese Office Action dated Sep. 30, 2008, issued in corresponding JP Application No. 2005-013189 with English translation.

* cited by examiner

*Primary Examiner*—John A Tweel, Jr.
(74) *Attorney, Agent, or Firm*—Nixon & Vanderhye, PC

(57) ABSTRACT

In a display device, a display member for displaying information as an image receives a light from a light source arranged behind and is illuminated by the light. A decorative member is arranged on the front surface of the display member to partly cover the display member. The decorative member is illuminated by the light passing through the display member. The decorative member rises from the front surface of the display member and illuminates, thereby providing an enhanced three-dimensional appearance.

18 Claims, 5 Drawing Sheets

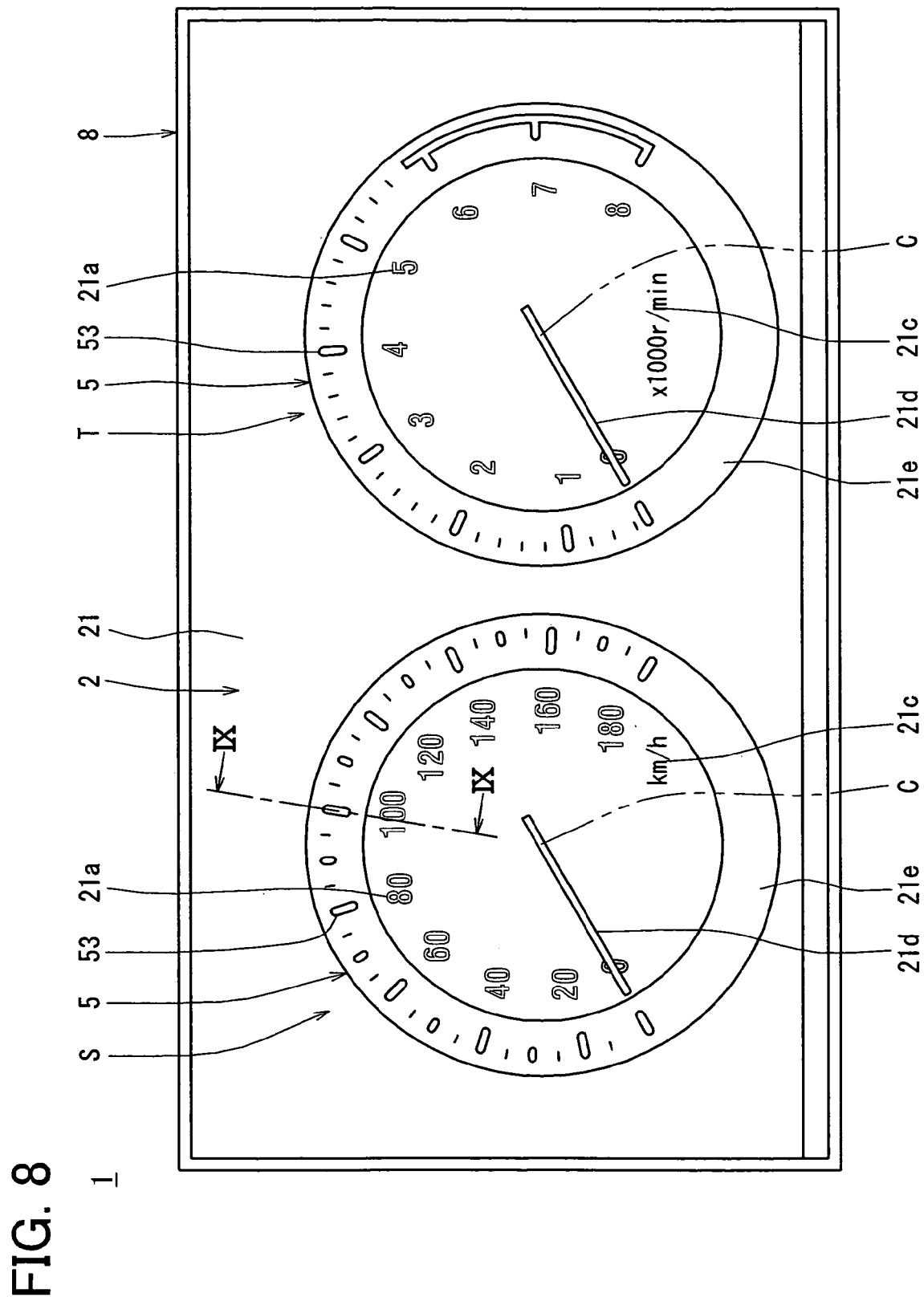

DISPLAY DEVICE HAVING DECORATIVE MEMBER ON SCREEN

CROSS REFERENCE TO RELATED APPLICATION

This application is based on Japanese Patent Application No. 2005-13189 filed on Jan. 20, 2005, the disclosure of which is incorporated herein by reference.

FIELD OF THE INVENTION

The present invention relates to a display device capable of displaying various information to be visible to a user, and is for example used to a vehicle for indicating operation conditions of the vehicle to a driver.

BACKGROUND OF THE INVENTION

According to a display device for a vehicle disclosed in Japanese Unexamined Patent Publication No. 8-268114, a display unit has a first display for displaying a first image and a second display for displaying a second image. The first display and the second display are constructed of liquid crystal elements. When an optical unit is set to the display unit, the first image is displayed as a real image on the first display. Also, the second image displayed on the second display is reflected by a reflection mirror and displayed as virtual image on a combiner arranged on a dash board. When the optical unit is removed from the display unit, the first image and the second image are displayed as real images on the first display and the second display, respectively. However, the images displayed on the first and second displays and the combiner are visible as two-dimensional images.

SUMMARY OF THE INVENTION

The present invention is made in view of the foregoing matter, and it is an object of the present invention to provide a display device capable of providing an enhanced, three-dimensional appearance on a display member with a simple structure.

According to an aspect of the present invention, a display device has a display member having a screen for displaying information as an image. The display member is illuminated by light emitted from a light source that is provided behind the display member. A decorative member is located on a surface of the display member on a side opposite to the light source to partly cover the display member. The decorative member is made of a material that allows light to pass through. Thus, the decorative member is illuminated by receiving the light that has passed through the display member.

Accordingly, the decorative member is visible as projecting from the screen of the display member. That is, the decorative member provides a three-dimensional appearance. Therefore, an appearance of the display device enhances.

Since the decorative member is illuminated by the light passing through the display member, the decorative member is easily recognized. Accordingly, the three-dimensional appearance is further enhanced. Also, it is not necessary to provide an additional light source for the decorative member. Accordingly, it is effective to reduce manufacturing costs.

BRIEF DESCRIPTION OF THE DRAWINGS

Other objects, features and advantages of the present invention will become more apparent from the following detailed description made with reference to the accompanying drawings, in which like parts are designated by like reference numbers and in which:

FIG. 8 is a plan view of a combination meter according to a second embodiment of the present invention;

DETAILED DESCRIPTION OF EMBODIMENTS

Hereafter, embodiments of the present invention will be described with reference to the drawings. In the embodiments, a display device of the present invention is for example used to a combination meter of a vehicle.

Figure 1:
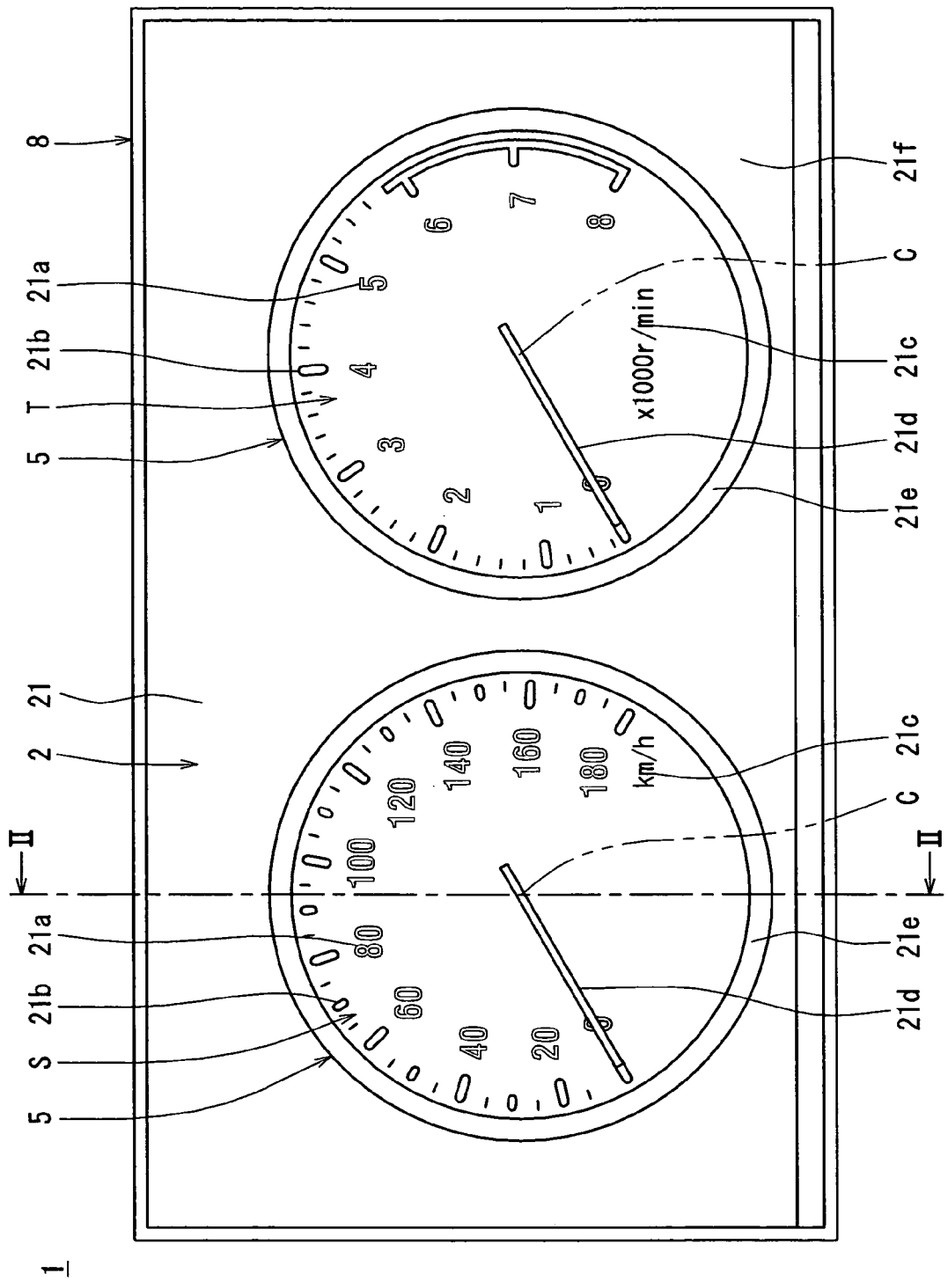
FIG. 1 is a plan view of a combination meter according to a first embodiment of the present invention.

Referring to FIG. 1, a combination meter 1 of a first embodiment is generally mounted in an instrument panel at a front part of a passenger compartment in the vehicle. The combination meter 1 is provided to display various information relating to operation conditions of the vehicle as images on a screen section of a display member 2 for a driver. For example, a speed meter S for indicating a traveling speed of the vehicle and a tachometer T for indicating a rotational speed of an engine of the vehicle are formed as images on a screen 21 of the display member 2.

Figure 2:
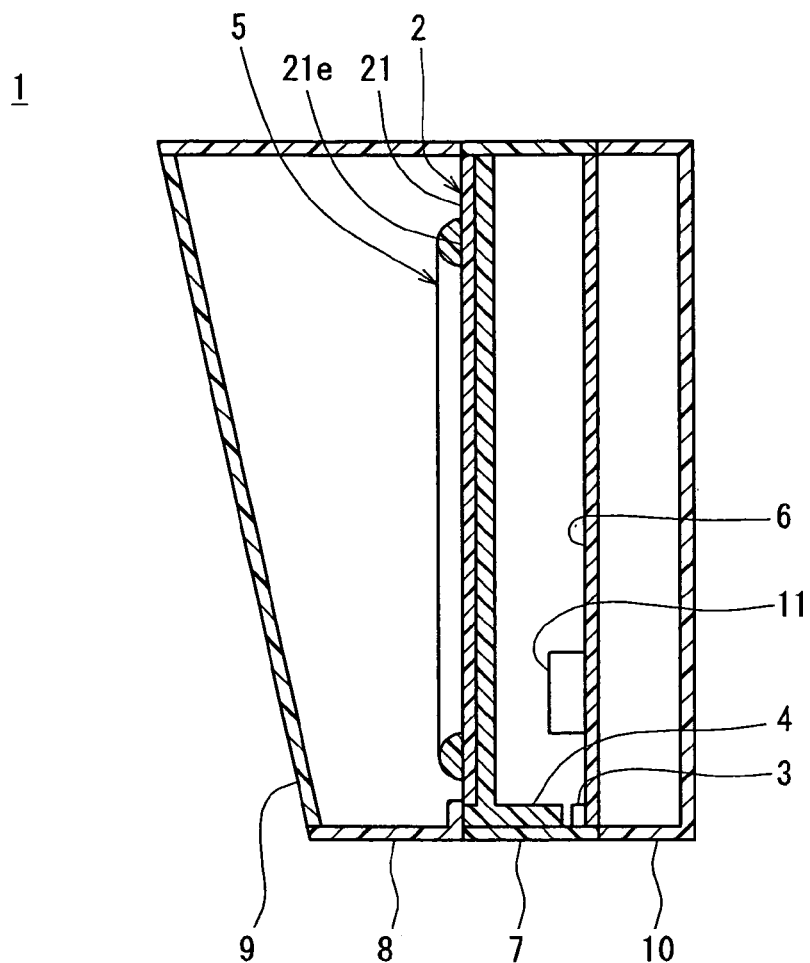
FIG. 2 is a cross-sectional view of the combination meter taken along a line II-II of FIG. 1.

The display member 2 is for example constructed of a liquid crystal panel. A TFT (Thin Film Transistor) type liquid crystal panel is used in the embodiment. The liquid crystal panel 2 transmits light. As shown in FIG. 2, a light emitting diode 3 is arranged on a rear side (right side in FIG. 2) of the liquid crystal panel 2. Thus, the liquid crystal panel 2 is illuminated by receiving light from the light emitting diode 3.

Here, each of the speed meter S and the tachometer T is displayed as an analog meter having a pointer, as shown in FIG. 1. Numbers 21a, scales 21b, letters 21c and a pointer 21d are formed as images in each of the speed meter S and the tachometer T. Further, the pointer 21d is displayed to rotate about a center C, thereby to indicate the speed of the vehicle or the rotational speed of the engine. The scales 21d are arranged on a circle having the center C. Each of the scales 21d extends in a radial direction.

Further, lighting portions 21e are formed on the periphery of the scales 21d. The lighting portion 21e is concentric with the scales 21b arranged on the circle and forms a contour of the speed meter S and the tachometer T. On each of the lighting portions 21e, a decorative ring 5 is arranged. Thus, each of the lighting portions 21e has a shape corresponding to the shape of the decorative ring 5. Here, the lighting portion 21e has a circular shape. The lighting portions 21e are formed as a second image for illuminating the decorative rings 5.

When the liquid crystal panel 2 is lit by the light emitting diode 3, the numbers 21a, the letters 21c, the scales 21b, the pointer 21d, the lighting portion 21e and a base portion 21f of the screen 21 are illuminated with predetermined colors. For example, the numbers 21a and the letters 21c are illuminated with black. The scales 21b are illuminated with blue. The pointer 21d is illuminated with orange. The lighting portion 21e is illuminated with amber. The base portion 21f of the screen 21 is illuminated with white.

The decorative rings 5 are attached to a front surface of the liquid crystal panel 2. The decorative rings 5 are in contact with the front surface of the screen 21 and partly cover the screen 21. That is, each of the decorative rings 5 is arranged on the lighting portion 21e. The decorative ring 5 is made of a light transmitting material to allow the light from the light emitting diode 3 to pass through. For example, the decorative ring 5 is made of transparent acrylic resin or polycarbonate resin. The decorative ring 5 has a semi-circular cross-section, as shown in FIG. 2. When lit by the light passed through the lighting portion 21e, the decorative ring 5 is illuminated with amber. The decorative rings 5 are for example glued to the front surface of the liquid crystal panel 2.

On the rear side of the liquid crystal panel 2, that is, on the right side in FIG. 2, a printed board 6 is arranged. The light emitting diode 3 is mounted on the printed board 6 as a light source for lighting the liquid crystal panel 2. The light emitting diode 3 emits white light, for example.

Further, a diffusion plate 4 is arranged in contact with the rear surface of the liquid crystal panel 2. The diffusion plate 4 is made of a material that allows light to pass through. For example, the diffusion plate 4 is made of acrylic resin or polycarbonate resin. Also, the diffusion plate 4 has a plate section having a shape substantially corresponding to the shape of the liquid crystal panel 2. The diffusion plate 4 has a diffuse reflection layer for diffusing and reflecting the light emitted from the light emitting diode 3. The diffuse reflection layer is formed of one of a grained surface, dot printed layer, or a printed layer with a light color such as white or silver, for example.

The light emitted from the light emitting diode 3 is reflected by the diffuse reflection layer and emitted from the diffusion plate 4. Thus, a luminous intensity is generally uniformed over the diffusion plate 4. Namely, the diffusion plate 4 functions as a surface light source that emits light equally over the surface. By this, the luminous intensity of the liquid crystal panel 2 is uniformed over the panel 2, thereby enhancing the appearance of the combination meter 1.

Figure 3:
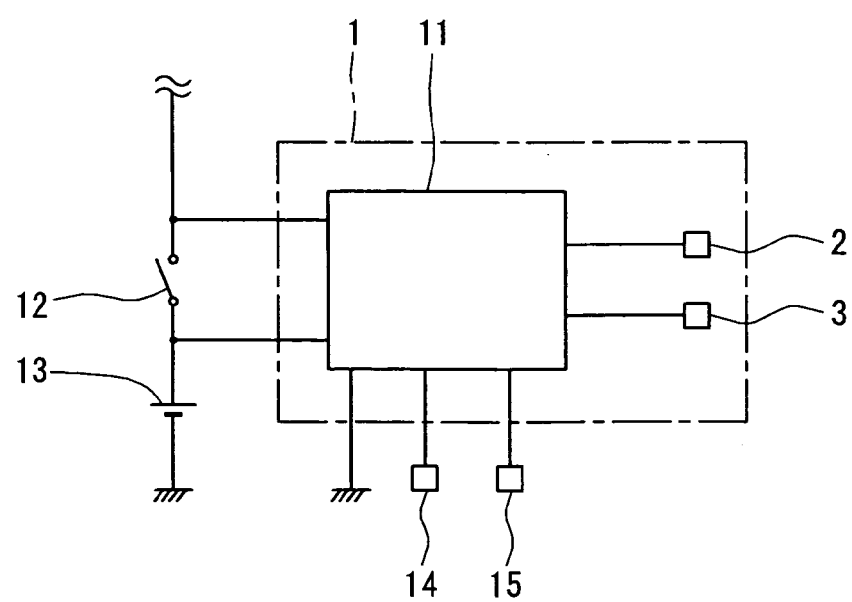
FIG. 3 is a circuit diagram of the combination meter according to the first embodiment of the present invention.

The printed board 6 is for example constructed of a glass epoxy board, and provides an electric circuit for the combination meter 1. On the printed board 6, a controller 11 is mounted with the light emitting diode 3. The controller 11 receives external signals such as detection signals from a vehicle speed sensor 14 and a rotational speed sensor 15, as shown in FIG. 3. Further, the controller 11 calculates the traveling speed of the vehicle based on the signal from the speed sensor 14 and controls the liquid crystal panel 2 so that the traveling speed is indicated by the pointer 21c on the speed meter S. Also, the controller 11 calculates the rotational speed of the engine based on the signal from the rotational speed sensor 15 and controls the liquid crystal panel 2 so that the rotational speed of the engine is indicated by the pointer 21c on the tachometer T. The controller 11 is composed of a microcomputer, for example. The controller 11 also controls the light emitting diode 3.

A face member 8 is mounted on the front side of the liquid crystal panel 2, as shown in FIG. 2. The face member 8 has substantially a frame shape and is made of a resin material, for example. The rear end of the face member 8 is closely connected to the periphery of the front surface of the liquid crystal panel 2. Further, a transparent cover 9 is fixed to the front end of the face member 8. The transparent cover 9 is a thin plate member made of a light transmitting material such as acrylic resin or polycarbonate resin. The transparent cover 9 is provided to restrict the entry of dirt and foreign materials, such as dust and water drops, to the combination meter 1, thereby to maintain the liquid crystal panel 2 clean.

A case 7 is arranged on the rear side of the face member 8. The case 7 has substantially a frame shape and made of resin, for example. The case 7 surrounds the liquid crystal panel 2 and the printed board 6. Thus, the liquid crystal panel 2 and the printed board 6 are fixed by the case 7. Further, a rear cover 10 is arranged on the rear side of the case 7. The rear cover 10 surrounds a rear opening of the case 7, thereby to restrict the entry of dirt and foreign materials.

Next, the structure of the electric circuit of the combination meter 1 will be described.

As shown in FIG. 3, the controller 11 is normally electrically connected to the battery 13. The controller 11 is connected to an ignition switch 12 and is capable of detecting on and off of the ignition switch 12. Further, the controller 11 is connected to the liquid crystal panel 2 and the light emitting diode 3. Furthermore, the controller 11 is connected to the vehicle traveling speed sensor 14 and the rotational speed sensor 15 to receive the detection signals. The vehicle traveling speed sensor 14 detects a rotational speed of an output shaft of a transmission, that is, a rotational speed of a propeller shaft. The rotational speed sensor 15 detects a rotational speed of a crankshaft or a camshaft of an engine.

When the ignition switch 12 is turned on, the controller 11 detects that the ignition switch 12 is on and controls the combination meter 1 to be active. Specifically, the controller 11 operates the liquid crystal panel 2 first. Thus, the numbers 21a, the scales 21b, the letters 21c, and the pointers 21d of the speed meter S and the tachometer T are displayed with the predetermined color. Also, the lighting portions 21e are displayed with amber and the base portion 21f is displayed with white.

Next, the controller 11 calculates the vehicle traveling speed and the rotational speed of the engine based on the detection signals from the vehicle traveling speed sensor 14 and the rotational speed sensor 15. Further, the controller 11 operates the liquid crystal panel 2 so that the detected vehicle speed and the detected rotational speed of the engine are indicated by the pointers 21d, respectively. Simultaneously, the controller 11 operates the light emitting diode 3 to emit light. In this way, the speed meter S and the tachometer T are luminously displayed on the screen 21 of the liquid crystal panel 2 to be visible to the user.

In the above, the numbers 21a, the scales 21b, the letters 21c, the pointer 21d, the lighting portions 21e, and the base portion 21f are simultaneously displayed. However, it is not always necessary to display the preceding parts 21a through 21f simultaneously. The liquid crystal panel 2 can be controlled such that one of or some of the preceding parts 21a to 21f is/are displayed sequentially. For example, the pointers 21*d* are displayed first. Next, the lighting portions 21*e* and the base portion 21*f* are displayed. Thereafter, the numbers 21*a*, the scales 21*b* and the letters 21*c* are displayed.

Next, advantageous effects of the decorative rings 5 will be described.

In a display device without having the decorative rings 5, a screen of a display panel is directly viewed. Because the surface of the screen is flat, the images displayed thereon looks two-dimensional. On the other hand, in the embodiment, the decorative rings 5 are attached on the lighting portions 21*e* of the liquid crystal panel 2. During the operation of the combination meter 1, the decorative rings 5 are illuminated with amber by receiving light passing through the lighting portions 21*e*. Thus, it is visible that the decorative rings 5 rise from the screen 21 of the liquid crystal panel 2. That is, the screen 21 is visible as three-dimensional. Accordingly, a three-dimensional appearance is accented by the illuminated decorative rings 5, thereby enhancing the appearance of the combination meter 1.

In addition, a glare-proof film is generally provided on the screen 21 of the liquid crystal panel 2 for restricting reflection of external lights such as sunlight on the surface of the screen 21 and maintains visibility. Namely, even if the screen 21 receives the external lights, it does not reflect the external lights. However, the decorative rings 5 reflect the external lights. Thus, the decorative rings 5 are accented. Accordingly, the three-dimensional appearance of the combination meter 1 is further enhanced.

The illumination color of the numbers 21*a*, the scales 21*b*, the letters 21*c*, the pointers 21*d*, the lighting portions 21*e* and the base portion 21*f* are not limited to the above. These parts 21*a* through 21*f* can be illuminated with any other color combinations.

Figure 4:
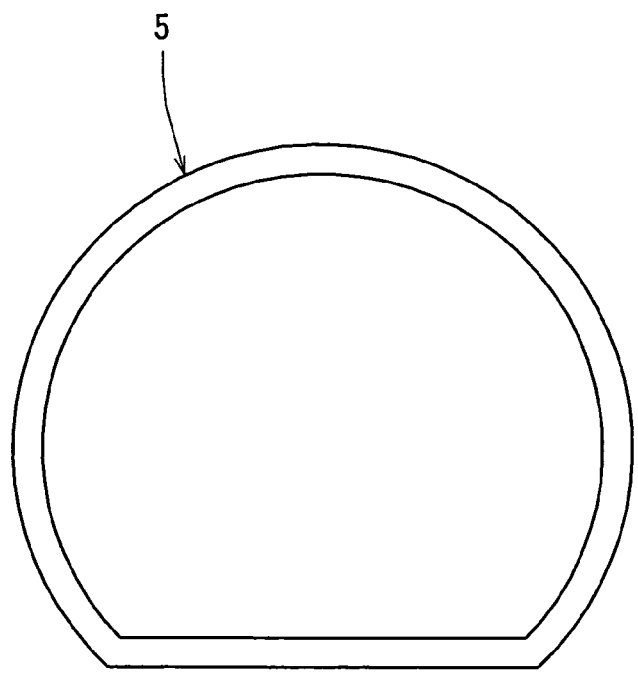
FIG. 4 is a plan view of a decorative ring for showing a modification of the first embodiment of the present invention.
Figure 5A:
FIG. 5A is a cross-sectional view of the decorative ring for showing another modification of the first embodiment of the present invention.
Figure 5B:
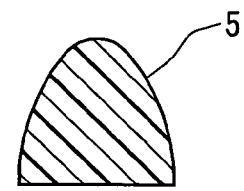
FIG. 5B is a cross-sectional view of the decorative ring for showing further another modification of the first embodiment of the present invention.

The shape of the decorative rings 5 is not limited to the circular shape shown in FIG. 1. For example, each of the decorative rings 5 can have a shape shown in FIG. 4. Alternatively, the decorative ring 5 can be an arc shape. Further, the cross-section of the decorative ring 5 is not limited to the semi-circular shape shown in FIG. 2. As shown in FIGS. 5A and 5B, the decorative rings 5 can have a polygonal cross-section or a semi-elliptical cross-section.

Figure 6:
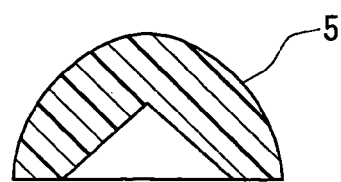
FIG. 6 is a cross-sectional view of the decorative ring for showing still another modification of the first embodiment of the present invention.

Further, in the first embodiment, the decorative rings 5 are attached such that the rear surfaces of the decorative rings 5 are fully and closely in contact with the front surface of the screen 21. However, the attachment of the decorative rings 5 are not limited to the above. For example, in a case that the decorative rings 5 have the cross-sectional shape shown in FIG. 6, the rear surfaces of the decorative rings 5 are partly in contact with the front surface of the screen 21.

Figure 7:
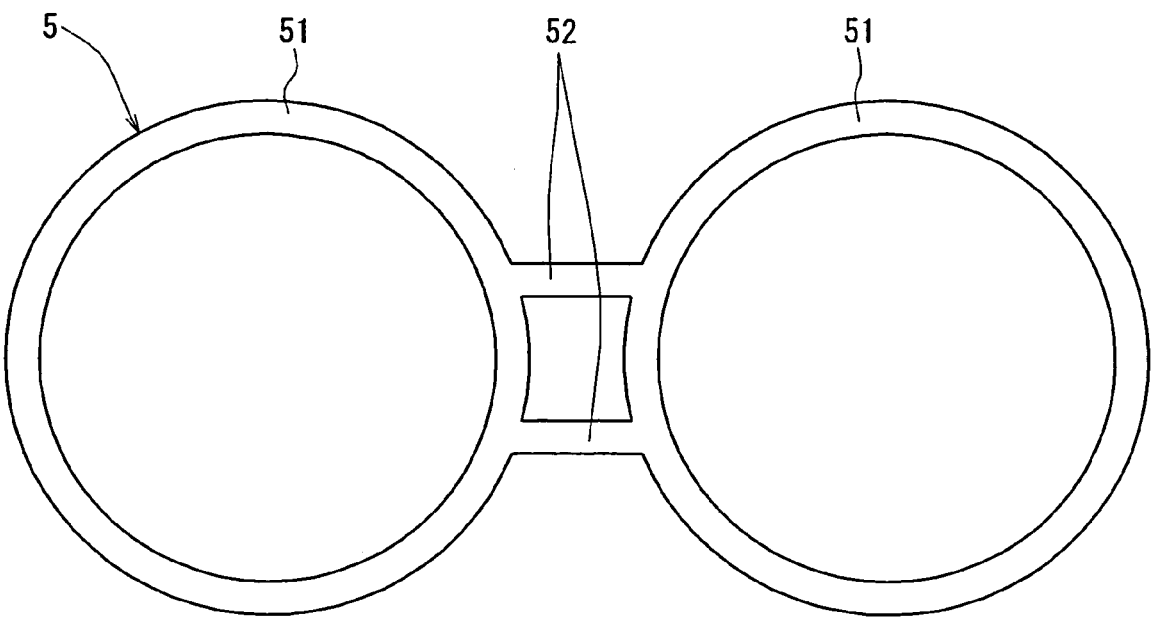
FIG. 7 is a plan view of the decorative ring for showing yet another modification of the first embodiment of the present invention.

In the combination meter 1 of the embodiment, the decorative rings 5 are provided for each of the speed meter S and the tachometer T. That is, the combination meter 1 has two separate decorative rings 5. However, the decorative rings 5 can be provided from a single member, as shown in FIG. 7. For example, the decorative ring member 5 has two ring portions 51 connected through a bridge portion 52. In this case, the lighting portions 21*e* can have a shape only corresponding to the ring portions 51 or a shape corresponding the ring member 5 including the bride portion 52. In the latter, the illumination color of the lighting portions 21*e* can be modified such that the ring portions 51 and the bridge portion 52 are illuminated with different color.

Next, a second embodiment of the present invention will be described with reference to FIG. 8. In the second embodiment, the decorative rings 5 have structure different from that of the first embodiment. Also, the display design of the speed meter S and the tachometer T is changed from that of the first embodiment. Other structural parts are similar to those of the first embodiment.

Figure 9:
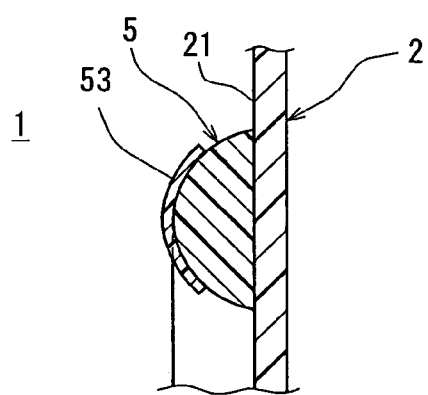
FIG. 9 is a cross-sectional view of the combination meter taken along a line IX-IX of FIG. 8.

Specifically, the scales of the speed meter S and the tachometer T, which is a part of the display design, are included in the decorative rings 5. The scales are provided by color layers 53 that are formed on the surface of the decorative rings 5 such as by printing or hot stamping, as shown in FIG. 9.

Since the scales of the speed meter S and the tachometer T are formed at a position rising from the screen 21, the appearance of the decorative rings 5 is enhanced. Accordingly, the appearance of the combination meter 1 is further enhanced by the three-dimensional appearance of the decorative rings 5 having the scales 53 thereon.

In a bright ambience, such as under sunlight, because the color layers 53 reflect the external light, the color layers 53 are visible with the color. On the contrary, in a dark ambience, such as in the night, because the color layer 53 do not receive the external light, the scales are visible with black against the decorative rings 5 that are illuminated with the color of the lighting portions 21*e* as the background. That is, the scales are visible with different color depending on the ambience. Therefore, the appearance of the combination meter 1 is further enhanced.

It is not always necessary to form the color layers 53 on the front surface of the decorative rings 5. For example, the color layers 53 can be formed on the rear surface of the decorative rings 5, which faces and contact the front surface of the screen 21.

Figure 10A:
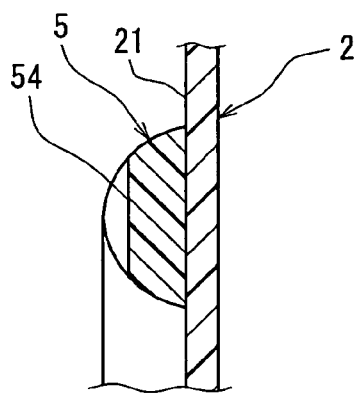
FIG. 10A is a cross-sectional view of a decorative ring for showing a modification of the second embodiment of the present invention.
Figure 10B:
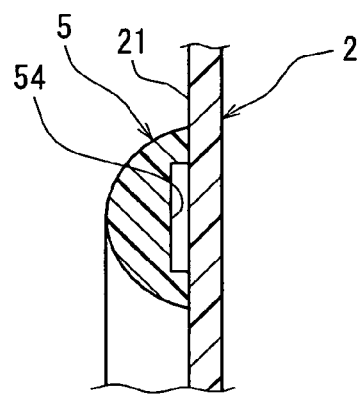
FIG. 10B is a cross-sectional view of the decorative ring for showing another modification of the second embodiment of the present invention.

Alternatively, the scales of the speed meter S and the tachometer T can be provided by forming recesses on the decorative rings 5. For example, recessed portions 54 are formed on either the front surface or the rear surface of the decorative rings 5, as shown in FIGS. 10A and 10B.

In the second embodiment, the part of the display design is formed on the decorative rings 5. That is, the scales of the speed meter S and the tachometer T are formed on the decorative rings 5. However, the display design formed on the decorative rings 5 is not limited to the scales. For example, both the numbers 21*a* and the scales, or only the numbers 21*a* can be formed on the decorative rings 5.

Further, the shape of the decorative rings 5 are not limited to the circular shape. The decorative rings 5 can have the shape shown in FIG. 4 or 7, or another shape.

In the first and second embodiments, each of the speed meter S and the tachometer T is designed as an analog meter having the pointer. However, the design of the speed meter S and the tachometer T is not limited to the above. For example, at least one of the speed meter S and the tachometer T can be designed as a digital-type meter.

In the first and second embodiments, the speed meter S and the tachometer T are displayed on the screen 21 of the liquid crystal panel 2. However, the images displayed on the screen 21 is not limited to the above. For example, another meter or indicator for indicating another information can be displayed on the screen 21 in addition to the speed meter S and the tachometer T. Instead of the speed meter S and the tachometer T, another indicator or meter can be displayed on the screen 21. Furthermore, the arrangement of the speed meter S and the tachometer T are not limited to the above.

Further, the light source for applying light to the liquid crystal panel 2 is not limited to the light emitting diode 3. Another light source such as an electric lump, a discharge tube, or an EL panel can be used. Further, the mounting position of the light emitting diode 3 is not limited to the position shown in FIG. 2.

Further, the display device is not limited to the combination meter of the vehicle. The display device of the present invention can be used in any other consumer devices.

In the embodiments, the decorative members 5 have the ring shape corresponding to the outer shape of the speed meter S and the tachometer T, and accents the contour of the speed meter S and the tachometer T. Thus, the appearance of the display member 2 is enhanced. Further, the lighting portions 21e are formed for transmitting the light to the decorative members 5 as the second image. By this, the illumination color of the decorative rings 5 is differentiated from the illumination color of the other parts, such as the pointer 21d and the numbers 21a. Furthermore, the decorative members 5 can be illuminated with different color and at a different timing from the other parts. Accordingly, the images are attractively shown on the display member 2.

The present invention is not limited to the above embodiments, but may be implemented in other ways without departing from the spirit of the invention.

What is claimed is:

1. A display device comprising:
   a display member including a liquid crystal display panel having a screen for displaying information as an image;
   a light source located behind the display member for emitting light to illuminate the display member; and
   a decorative member located on a surface of the screen of the liquid crystal display panel of the display member so as to project from a light exiting surface of the screen on a side opposite to the light source and disposed to partly cover the screen, said decorative member having a surface of incidence in opposed facing relation to the light exiting surface of the screen of the liquid crystal display panel and receiving light exiting said light exiting surface, wherein the decorative member is made of a material that transmits light, and is illuminated by the light passing through the display member.

2. The display device according to claim 1, wherein the decorative member has a shape relative to the image.

3. The display device according to claim 2, wherein the decorative member has a ring shape.

4. The display device according to claim 1, wherein the decorative member includes a design part corresponding to the image.

5. The display device according to claim 1, wherein the display member forms a second image at a position corresponding to the decorative member for transmitting the light to the decorative member.

6. The display device according to claim 1, wherein the decorative member has a semi-circular cross-section.

7. The display device according to claim 1, wherein the image displayed on the display member includes an analog meter having a pointer and numbers for indicating the information, and the decorative member has a shape corresponding to a contour of the analog meter.

8. The display member according to claim 7, wherein the decorative member has a ring shape.

9. The display device according to claim 7, wherein the display member forms a second image at a position covered by the decorative member, and the second image, the pointer and the numbers are displayed with different colors.

10. The display device according to claim 7, wherein the decorative member has scales corresponding to the analog meter thereon.

11. The display device according to claim 10, wherein the scales are printed on a surface of the decorative member.

12. The display device according to claim 10, wherein the scales are provided by recessed portions formed on a surface of the decorative member.

13. The display device according to claim 1, wherein the image displayed on the display member is a meter for indicating the information with numbers, and the decorative member is disposed on a periphery of the meter.

14. The display device according to claim 13, wherein the display member forms a second image at a position covered by the decorative member, and the second image and the number are displayed with different colors.

15. The display device according to claim 1, wherein the decorative member includes a plurality of ring portions and a bridge portion that connects at least two of the plurality of ring portions.

16. The display device according to claim 3, wherein the information is displayed in an area surrounded by the ring-shaped decorative member on the screen.

17. The display device according to claim 1, wherein the decorative member is directly in contact with the surface of the screen of the display member.

18. The display device according to claim 5, wherein the decorative member is in contact with the surface of the screen of the display member and covers the second image.

* * * * *